US010041799B2

(12) United States Patent
Bostick et al.

(10) Patent No.: US 10,041,799 B2
(45) Date of Patent: Aug. 7, 2018

(54) AUTOMATIC BOUNDARY DETECTION AND TRANSACTION COMPLETION

(71) Applicant: International Business Machines Corporation, Armonk, NY (US)

(72) Inventors: James E. Bostick, Austin, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 694 days.

(21) Appl. No.: 14/599,629

(22) Filed: Jan. 19, 2015

(65) Prior Publication Data

US 2016/0210800 A1    Jul. 21, 2016

(51) Int. Cl.
*G01C 21/00* (2006.01)
*G06Q 30/00* (2012.01)
(Continued)

(52) U.S. Cl.
CPC .......... *G01C 21/005* (2013.01); *G06Q 30/00* (2013.01); *G06Q 50/265* (2013.01); *H04W 4/021* (2013.01)

(58) Field of Classification Search
CPC .... G01C 21/005; G06Q 30/00; G06Q 50/265; H04W 4/021
(Continued)

(56) References Cited

U.S. PATENT DOCUMENTS 9,559,796 B1 *   1/2017  Wang ..................... H04H 20/59
2009/0288012 A1 * 11/2009  Hertel .................... G06Q 20/02
                                                              715/738
(Continued)

FOREIGN PATENT DOCUMENTS

WO    2010044837 A1    4/2010
WO    2013147704 A1   10/2013

OTHER PUBLICATIONS

Google, How to use Fancy on Glass, http://fancy.com/help/glass, 2014.
(Continued)

*Primary Examiner* — Anne M Antonucci
*Assistant Examiner* — James E Stroud
(74) *Attorney, Agent, or Firm* — Garg Law Firm, PLLC; Rakesh Garg; Christopher K. McLane (57) ABSTRACT

In a method for navigating across a boundary in geographical space, a present location of a hardware device is received at an application executing in the hardware device. Using a mapping data, a boundary is identified relative to the present location. In a communication with a system associated with the boundary, in a first transaction, a condition is determined that has to be satisfied prior to crossing the geographical location according to the boundary. A determination is made whether a permission document sufficient to satisfy the condition is accessible from the device. Responsive to the permission document being accessible from the device, the permission document is presented automatically to the system in a second transaction. An indication is made at the device, responsive to an acceptance of the permission document in a second transaction received from the system, that the device is permitted to navigate across the boundary.

20 Claims, 5 Drawing Sheets

(51) Int. Cl.
*G06Q 50/26* (2012.01)
*H04W 4/021* (2018.01)

(58) Field of Classification Search
USPC .......................................................... 701/435
See application file for complete search history.

(56) References Cited

U.S. PATENT DOCUMENTS

| | | | |
|---|---|---|---|
| 2012/0212406 A1 | 8/2012 | Osterhout et al. | |
| 2013/0035114 A1* | 2/2013 | Holden | H04W 4/028 455/456.3 |
| 2014/0161465 A1* | 6/2014 | Peterson | G06F 3/04847 398/118 |
| 2014/0171039 A1 | 6/2014 | Bjontegard | |
| 2015/0053144 A1* | 2/2015 | Bianchi | A01K 27/001 119/720 |
| 2015/0111524 A1* | 4/2015 | South | H04W 4/22 455/404.2 |
| 2016/0157275 A1* | 6/2016 | Matthews | A01B 69/008 701/2 |
| 2016/0360697 A1* | 12/2016 | Diaz | G05D 1/0061 |

OTHER PUBLICATIONS

Marketingland, Fancy Brings E-Commerce to Google Glass, http://marketingland.com/fancy-wants-to-bring-shopping-to-google-glass-48501, Jun. 17, 2013.
Rooke, Will Google Glass be good for ecommerce?, https://econsultancy.com/blog/63022-will-google-glass-be-good-for-ecommerce, Jul. 8, 2013.

* cited by examiner

AUTOMATIC BOUNDARY DETECTION AND TRANSACTION COMPLETION

TECHNICAL FIELD

The present invention relates generally to a method, system, and computer program product for navigating across geographical boundaries. More particularly, the present invention relates to a method, system, and computer program product for automatic boundary detection and transaction completion.

BACKGROUND

A variety of tools and technologies are presently available for navigating in geographical spaces. Global Positioning System (GPS) is a well known technology that sees prevalent use in navigating in geographical spaces. Cellular triangulation is another technology that is used either as an assistive method to GPS navigation or as a stand-alone method for navigation.

Navigating in geographical spaces essentially uses two things—a map of the geographical space, and a location of the navigation device in that map. Generally, a map database provides the mapping data for the first part, and GPS or other technology provides the navigating device's location relative to that mapping data.

Geographical spaces include boundaries. These boundaries are defined in a variety of ways. For example, countries have boundaries or borders relative to other countries. Similarly, states or provinces within a country have boundaries with other states or provinces. Likewise, cities, town, and suburbs have boundaries. Airspace boundaries exist in the air and maritime boundaries exist in navigable waters.

Furthermore, the boundaries can be interpreted in other ways as well. For example, the premises of a sporting arena have a boundary, a perimeter of a building is a boundary, and an area within a building also has boundary.

Some boundaries are visible to humans, and other boundaries are not. For example, a boundary on land between countries can be visibly marked with physical markers, or can be unmarked and therefore invisible. A boundary in a water body is often not marked with visible markers. Vast land areas including several real properties may not have visible markings demarcating one property from another.

Navigation maps are capable of representing some boundaries that are otherwise invisible in a physical form in the geographical space. For example, maps show continuous boundaries between countries, over land, in water, and in the air, regardless of whether corresponding boundaries are physically marked in the corresponding geographical space.

SUMMARY

The illustrative embodiments provide a method, system, and computer program product for automatic boundary detection and transaction completion. An embodiment includes a method for navigating across a boundary in geographical space. The embodiment receives, at an application executing in a hardware device, a present location of the hardware device. The embodiment identifies, using a mapping data, a boundary relative to the present location, wherein the device is expected to cross a geographical location according to the boundary at a future time. The embodiment communicates, in a first transaction with a system associated with the boundary, to determine a condition that has to be satisfied prior to crossing the geographical location according to the boundary. The embodiment determines whether a permission document sufficient to satisfy the condition is accessible from the device. The embodiment presents, automatically, and responsive to the permission document being accessible from the device, the permission document to the system in a second transaction. The embodiment indicates, at the device, responsive to an acceptance of the permission document in a second transaction received from the system, that the device is permitted to navigate across the boundary at the geographical location.

Another embodiment includes a computer program product for navigating across a boundary in geographical space. The embodiment further includes one or more computer-readable tangible storage devices. The embodiment further includes program instructions, stored on at least one of the one or more storage devices, to receive, at an application executing in a hardware device, a present location of the hardware device. The embodiment further includes program instructions, stored on at least one of the one or more storage devices, to identify, using a mapping data, a boundary relative to the present location, wherein the device is expected to cross a geographical location according to the boundary at a future time. The embodiment further includes program instructions, stored on at least one of the one or more storage devices, to communicate, in a first transaction with a system associated with the boundary, to determine a condition that has to be satisfied prior to crossing the geographical location according to the boundary. The embodiment further includes program instructions, stored on at least one of the one or more storage devices, to determine whether a permission document sufficient to satisfy the condition is accessible from the device. The embodiment further includes program instructions, stored on at least one of the one or more storage devices, to present, automatically, and responsive to the permission document being accessible from the device, the permission document to the system in a second transaction. The embodiment further includes program instructions, stored on at least one of the one or more storage devices, to indicate, at the device, responsive to an acceptance of the permission document in a second transaction received from the system, that the device is permitted to navigate across the boundary at the geographical location.

Another embodiment includes a computer system for navigating across a boundary in geographical space. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to receive, at an application executing in a hardware device, a present location of the hardware device. The embodiment further includes program instructions, stored on at least one of the one or more storage devices for execution by at least one of the one or more processors via at least one of the one or more memories, to identify, using a mapping data, a boundary relative to the present location, wherein the device is expected to cross a geographical location according to the boundary at a future time. The embodiment further includes program instructions, stored on at least one of the one or more storage devices for execution by at least one of the one or more processors via at least one of the one or more memories, to communicate, in a first transaction with a system associated with the boundary, to determine a condition that has to be satisfied prior to crossing the geographical location according to the boundary. The embodiment further includes program instructions, stored on at least one of the one or more storage devices for execution by at least one of the one or more processors via at least one of the one or more memories, to determine whether a permission document sufficient to satisfy the condition is accessible from the device. The embodiment further includes program instructions, stored on at least one of the one or more storage devices for execution by at least one of the one or more processors via at least one of the one or more memories, to present, automatically, and responsive to the permission document being accessible from the device, the permission document to the system in a second transaction. The embodiment further includes program instructions, stored on at least one of the one or more storage devices for execution by at least one of the one or more processors via at least one of the one or more memories, to indicate, at the device, responsive to an acceptance of the permission document in a second transaction received from the system, that the device is permitted to navigate across the boundary at the geographical location.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that some boundaries in geographical spaces have conditions, restrictions, or limitations associated with crossing those boundaries. The illustrative embodiments further recognize that some other boundaries place conditions or restrictions on conducting an operation across those boundaries.

For example, having a hunting license on one real property usually does not extend to an adjacent real property delimited a boundary that may not be visible to the hunter. Similarly, a fisherman with an American fishing license can easily cross the invisible international boundary between the United States and Canada in the great lakes, and find himself in violation of Canadian fishing laws in Canadian waters across the boundary.

The illustrative embodiments further recognize that presently available navigation solutions are able to identify a boundary but do not do much else in facilitating the crossing of that boundary. Most presently available navigation solutions identify a boundary and leave the satisfaction of the conditions or procedures for crossing that boundary up to the user.

For example, a presently available navigation solution can inform the fisherman that he is at the Canadian border, but then it is up to the fisherman to determine how to legally cross the border and continue fishing on the other side. Similarly, a presently available navigation solution can inform a patron that she is at the stadium for the game, but then leaves it up to the patron to determine whether she has a ticket for the game, how to obtain a ticket for the game, and where to present the ticket for admission into the stadium.

The illustrative embodiments used to describe the invention generally address and solve the above-described problems and other problems related to navigating across boundaries in geographical spaces. The illustrative embodiments provide a method, system, and computer program product for automatic boundary detection and transaction completion.

An embodiment executes as a software application in a wearable device or another mobile device. For example, an embodiment can be implemented to execute in a device that is wearable proximate to a user's eye.

An embodiment allows a user to configure a profile. Within the profile, the user can configure one or more proximity distances for different types of boundaries. A proximity distance allows the embodiment to detect the corresponding type of boundary, when the device in which the embodiment is executing approaches such boundary within the proximity distance.

Furthermore, a proximity distance allows an embodiment to automatically engage in communications with an external data processing system, such as a boundary management data processing system, to automatically determine a condition associated with crossing the boundary. An embodiment further communicates with such external data processing system to complete a transaction that satisfies the condition associated with crossing the boundary so that the user can continue approaching and crossing the boundary without any additional effort.

Another embodiment presents to the user the condition, pre-requisites, and other information related to the boundary. The embodiment accepts one or more user inputs to communicate with the external data processing system to complete a transaction that satisfies the condition associated with crossing the boundary. Such an embodiment reduces the user's responsibilities and confusion before approaching and crossing the boundary.

According to an embodiment, existing mapping data can be augmented with additional information. Such additional information includes, but is not limited to, an identity of a boundary management data processing system that controls or operates automatic transactions for crossing or interacting with a boundary. Such additional information further includes a specification of a method of communicating with the boundary management data processing system to engage in such a transaction.

An embodiment executing in a mobile device uses such additional information in the mapping data for exchanging data with the boundary management data processing system. The embodiment further uses such additional information in conjunction with the data supplied by the boundary management data processing system, to complete a transaction with the boundary management data processing system for crossing or interacting with the boundary.

Hereinafter, any manner of legally interacting with a boundary is referred to as crossing the boundary. For example, being present within a specified distance of a boundary is an interaction with the boundary, and contemplated within the scope of the term "crossing" the boundary. Of course, going from one side of the boundary to another side of the boundary is contemplated within the scope of the term "crossing" the boundary.

As an example, an embodiment executing in a device detects that the device is within a proximity distance of a boundary defined in a mapping data. Using the additional information in the mapping data according to another embodiment, the embodiment identifies the boundary management data processing system that manages the conditions for crossing the boundary.

The embodiment establishes communication with the identified boundary management data processing system and receives information about one or more conditions associated with crossing the boundary. An example condition for crossing a boundary may be to be in possession of a ticket, license, or other suitable form of permission document (hereinafter, collectively and interchangeably referred to as a "permission document"). Another example condition for crossing a boundary may be to present a permission document at a designated location relative to the boundary prior to the crossing. Another example condition for crossing a boundary may be to purchase a ticket, license, or permission document.

These example conditions are not intended to be limiting on the illustrative embodiments. From this disclosure, those of ordinary skill in the art will be able to conceive other conditions applicable to crossing boundaries, and the same are contemplated within the scope of the illustrative embodiments.

Upon receiving the information about a condition for crossing the boundary, an embodiment determines whether the device has access to the permission document that satisfies the condition for crossing the boundary. For example, if the permission document is a ticket to a sporting event, a user of the device may have already purchased the ticket and stored the ticket information in the profile. Similarly, a fisherman may already have a US and a Canadian fishing license for fishing in Lake Erie, and the information of the licenses may be accessible from the device over a data network, such as from a cloud data storage. As another example, an international traveler may already have a visa to cross a boundary into a country, and an identifier of the visa may be stored in or accessible from the device where the embodiment is executing.

If the permission document is accessible to the embodiment, the embodiment engages in a transaction with the boundary management data processing system. The embodiment engages in the transaction using a communication protocol and a transaction protocol that are specified by the boundary management data processing system and supported by the embodiment.

The embodiment presents to the boundary management data processing system, as a part of the transaction, the permission document. The embodiment receives from the boundary management data processing system, as a part of the transaction, an acceptance, or rejection of the permission document. If the permission document is accepted, the embodiment notifies a user, configures the device, instructs another device such as a navigation control of a vehicle, or a combination thereof, to proceed with crossing the boundary. If the permission document is rejected or if there is an error in the transaction, the embodiment notifies a user, configures the device, instructs another device such as a navigation control of a vehicle, or a combination thereof, to take some corrective action before crossing the boundary.

If the permission document is not accessible to the embodiment, the embodiment engages in another transaction, such as an e-commerce transaction, with the boundary management data processing system. The embodiment engages in the transaction using a communication protocol and a transaction protocol that are specified by the boundary management data processing system and supported by the embodiment.

For example, the embodiment presents a method of payment or other suitable information from the profile to the boundary management data processing system to procure the permission document from the boundary management data processing system. Depending on the boundary management data processing system, the boundary management data processing system may regard the procuring of the permission document as presenting an acceptable permission document, and transmit an acceptance of the permission document to the embodiment. Alternatively, the embodiment performs a procuring transaction and a presenting transaction with the boundary management data processing system, resulting in an acceptance of the recently procured permission document. Thereafter, the embodiment notifies a user, configures the device, instructs another device such as a navigation control of a vehicle, or a combination thereof, to proceed with crossing the boundary.

The various embodiments can similarly perform any number or combination of transactions to satisfy any number or types of conditions associated with one or more boundaries. While the above embodiments automatically communicate and transact with the boundary management data processing system to determine and satisfy the conditions of a boundary crossing, some aspects of these embodiments can be performed with user inputs within the scope of the illustrative embodiments.

For example, upon receiving the information about a condition for crossing the boundary, an embodiment presents the condition information to a user via a user interface. The user provides an input indicating whether to procure the permission document, present an existing permission document, avoid crossing the boundary, and the like. Responsive to the user input, the embodiment engages in a transaction with the boundary management data processing system to present a permission document, procure a permission document, seek additional information, provide alternative permission document, make a user-specified request, and other possible transactions. Those of ordinary skill in the art will be able to conceive many other ways of user interactions and types of inputs relevant to crossing a boundary in a similar manner, and the same are contemplated within the scope of the illustrative embodiments.

A method of an embodiment described herein, when implemented to execute on a device or data processing system, comprises substantial advancement of the functionality of that device or data processing system in automatic boundary detection and transaction completion. For example, in order to cross a detected boundary, the prior-art has no capabilities to automatically complete transactions, configure the device, or satisfy the conditions associated with the crossing on behalf of a user. In contrast, an embodiment can detect proximity to a boundary, automatically determine the conditions associated with crossing the boundary, satisfy those conditions in an automated or semi-automated manner, and allow the device or the associated user to legally or satisfactorily cross the boundary. Such manner of automated boundary condition satisfaction is unavailable in presently available devices or data processing systems. Thus, a substantial advancement of such devices or data processing systems by executing a method of an embodiment improves the usability of the navigation technologies.

The illustrative embodiments are described with respect to certain navigation technologies, mapping data, boundary management conditions, permission documents, transactions, protocols, interfaces, profile contents, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
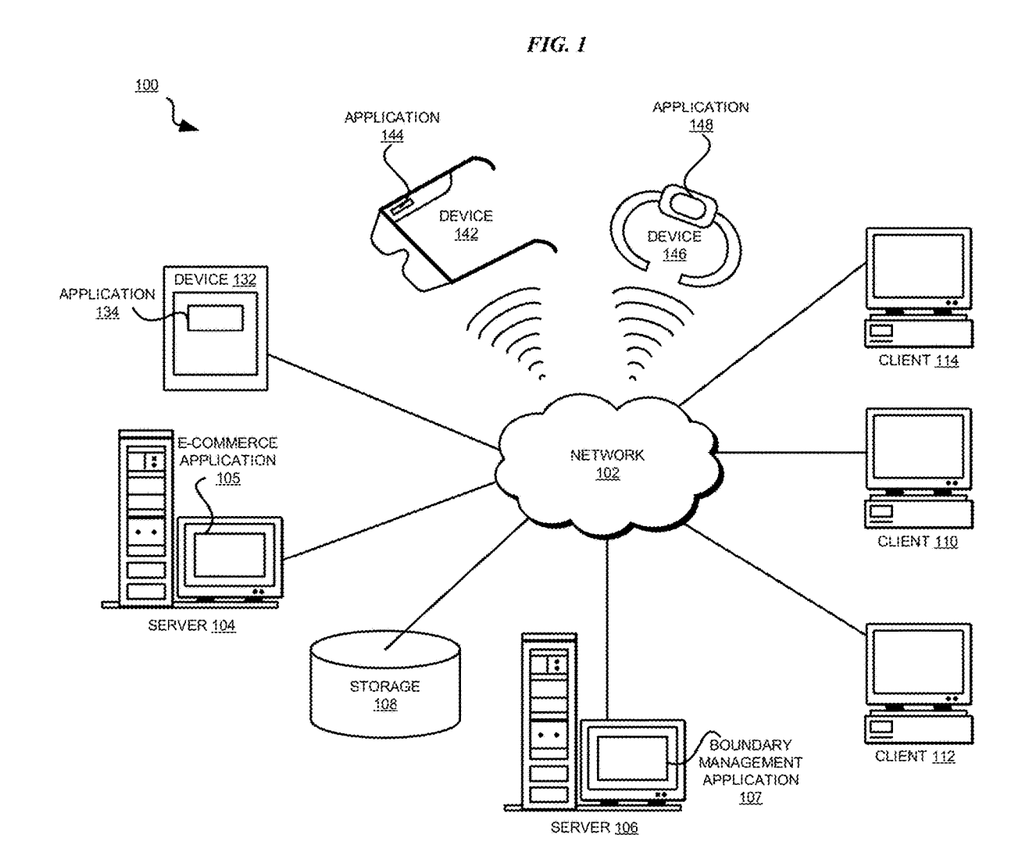
FIG. 1 depicts a block diagram of a network of data processing systems in which illustrative embodiments may be implemented.
Figure 2:
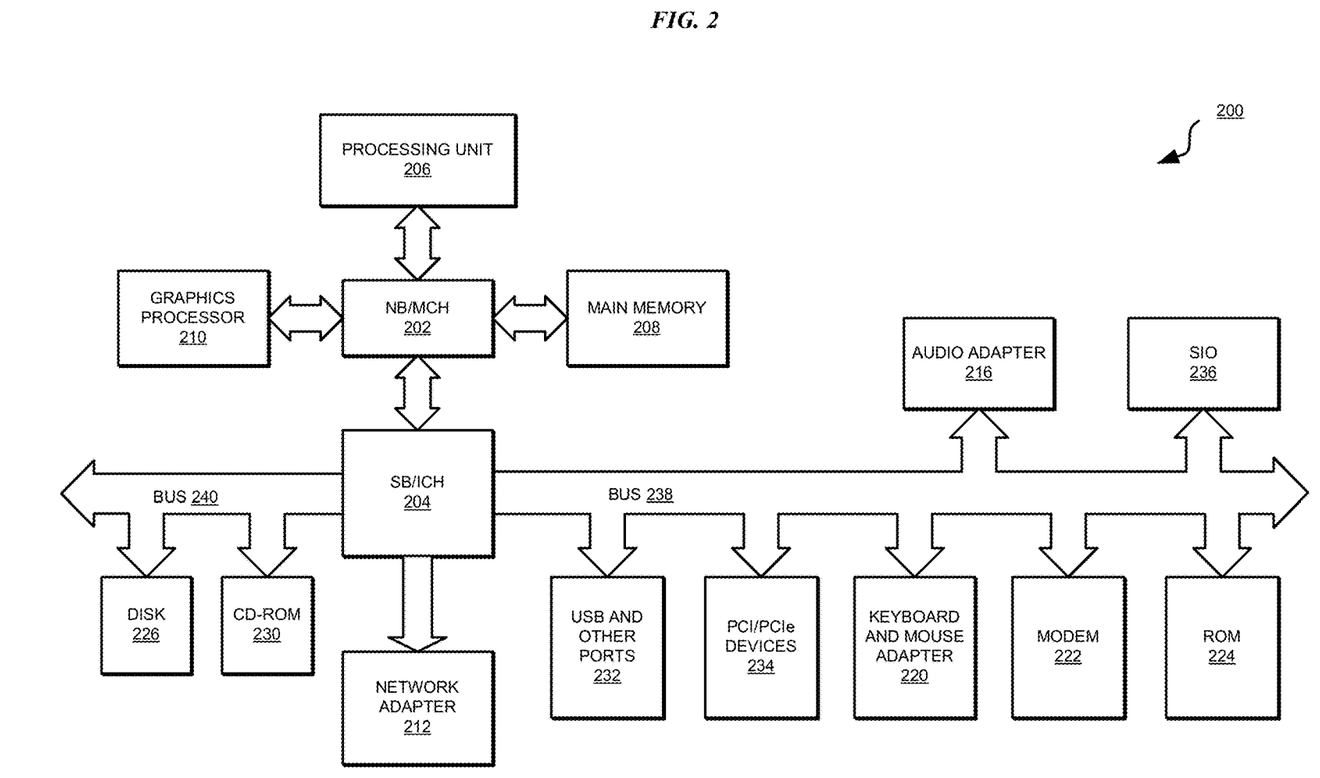
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Application 134 implements an embodiment described herein. Device 142 is an example of an eye-wearable device, in which application 144 implements an embodiment. Device 146 is an example of a wrist-wearable device, in which application 148 implements an embodiment. Generally, any data or information stored or produced in another data processing system in FIG. 1 can be configured to be stored or produced in devices 132, 142, and 146 in a similar manner. Server 104 is an example of all or a part of a boundary management data processing system, and executes e-commerce application 105. Server 106 is another example of all or a part of a boundary management data processing system, and executes boundary management application 107. Application 134, 144, or 148 communicate and transact with boundary management application 107, e-commerce application 105, or both, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as devices 132, 142, and 146 in FIG. 1 in which computer usable program code or instructions implementing the processes of the illustrative embodiments may be located. Data processing system 200 is described as a computer only as an example, without being limited thereto. Implementations in the form of other devices, such as devices 132, 142, and 146 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android' (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134, application 144, or application 148, in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
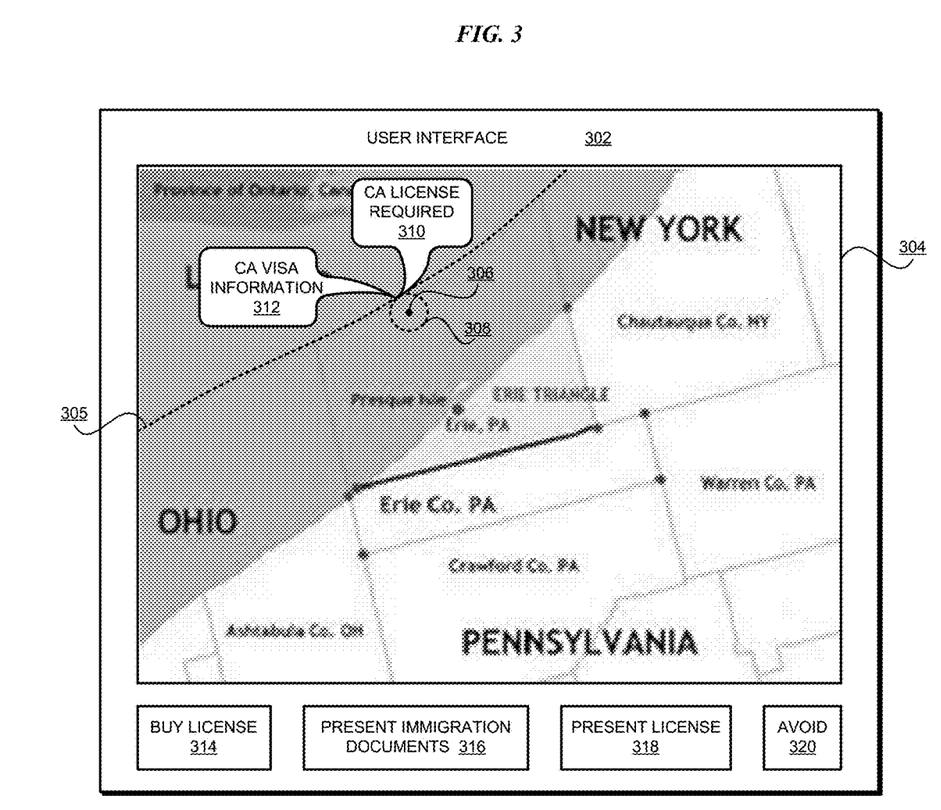
FIG. 3 depicts a block diagram of an example user interface presented to a user for automatic boundary detection and transaction completion in accordance with an illustrative embodiment.

With reference to FIG. 3, this figure depicts a block diagram of an example user interface presented to a user for automatic boundary detection and transaction completion in accordance with an illustrative embodiment. As an example, user interface 302 is presented by application 134, 144, or 148 in FIG. 1, when such application is configured to execute in a device that is equipped with a visual display component suitable for presenting user interface 302.

As an example, the application executes in a suitable device and displays example mapping data 304 with example boundary 305. The application shows the device's present location 306 relative to boundary 305 on mapping data 304. Depiction 308 is an example manner of depicting a proximity distance configured for a boundary of the type of boundary 305.

For example, the doted circle of depiction 308 is scaled according to the scale of mapping data 304 such that the center of the circle lies at present location 306 and the radius of the circle is the configured proximity distance to scale. As depicted, when there is zero or less distance between depiction 308 and boundary 305, the device is within the configured proximity distance of boundary 305.

The application may be able to identify the boundary management data processing system associated with boundary 305 at a distance greater than the proximity distance. Within the scope of the illustrative embodiments, the application can be configured to begin communicating with the boundary management data processing system while the device is at a distance greater than the proximity distance from boundary 305. Alternatively, when the device is at the proximity distance or less from boundary 305, the application establishes or acknowledges the data communication with the boundary management data processing system.

Using the additional information stored with mapping data 304, data received from the boundary management data processing system, or a combination thereof, the application presents one or more pieces of information on user interface 302. For example, information 310 informs a user of user interface 302 that boundary 305 is an international border across which is Canada, and a Canadian license, to wit, a permission document, is required to operate in Lake Erie on the Canadian side of boundary 305. Information 312 presents information about visa and immigration requirements, to wit, permission documents, needed to cross boundary 305.

As described elsewhere in this disclosure, the application can automatically present, procure, or both, one or more permission documents. In such operation of the application, the user is presented with information 310 and 312 optionally, and for informative purposes.

As also described elsewhere in this disclosure, the application can semi-automatically present, procure, or both, one or more permission documents with limited user involvement. In such operation of the application, the user is presented with information 310 and 312 to enable the user to make appropriate selections or inputs.

For example, in such an operation, user interface 302 graphically presents one or more control artifacts, using which the user can make one or more selections or provide one or more inputs. As an example, control 314 allows the user to indicate a desire to procure a license or another permission document from the boundary management data processing system. Other well known user interfaces can be presented from the application if further user inputs are needed to complete the procurement transaction.

As another example, control 316 allows the user to indicate a desire to present an existing immigration document or another permission document to the boundary management data processing system. Other well known user interfaces can be presented from the application if further user inputs are needed to complete the presentment transaction.

Similarly, if multiple permission documents are to be procured or presented, additional controls, such as example control 318, allow the user to make suitable procurement or presentation selections. Control 320 optionally allows the user to decide not to cross the boundary, or take another action.

The example boundary, proximity distance depiction, information displays, control artifacts, and operations corresponding to those control artifacts are not intended to be limiting on the illustrative embodiments. From this disclosure, those of ordinary skill in the art will be able to conceive many other ways and types of similar concepts, and the same are contemplated within the scope of the illustrative embodiments.

Figure 4:
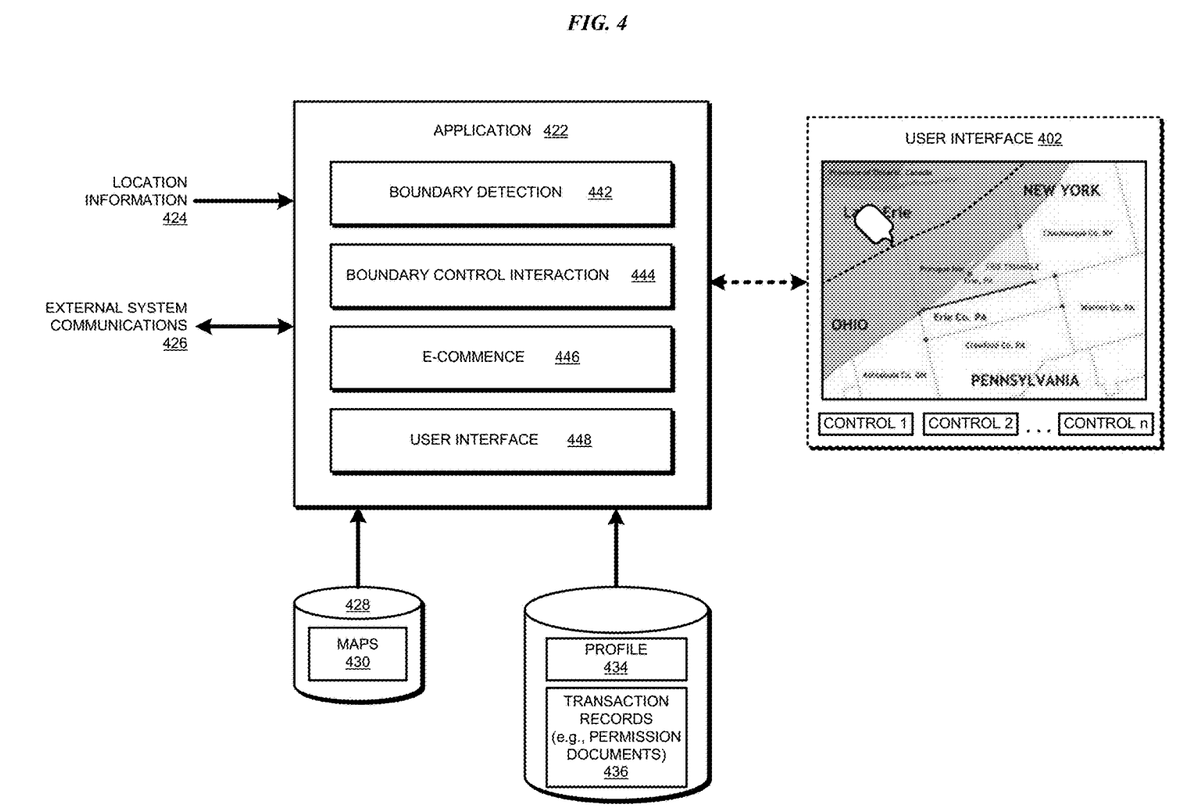
FIG. 4 depicts a block diagram of an example configuration for automatic boundary detection and transaction completion in accordance with an illustrative embodiment.

With reference to FIG. 4, this figure depicts a block diagram of an example configuration for automatic boundary detection and transaction completion in accordance with an illustrative embodiment. User interface 402 is an example of user interface 302 in FIG. 3. Application 422 is an example of any of applications 134, 144, or 148 in FIG. 1.

User interface 402 is optional in the depicted configuration. For example, application 422 can perform the operations described herein in an automated manner without needing user interface 402 to present any information or accept any input. Such an implementation of an embodiment is contemplated in embedded devices that interface with navigation equipment and communication equipment in a vehicle or vessel, but do not necessarily interface with humans in the vehicle or vessel. Such an implementation of an embodiment is useful in facilitating automatic crossing of manned or unmanned vehicles or vessels across boundaries while satisfying the conditions of the crossing.

Application 422 receives location information 424 as input. Location information 424 is the present location of the device where application 424 is executing, from any suitable location information source, including but not limited to GPS location from a GPS component coupled with the device.

Application 422 conducts external system communications 426, to transmit and receive information to and from a boundary management data processing system as described elsewhere in this disclosure. Repository 428 supplied mapping data 430 to application 422. Repository 432 contains one or more profiles configured in the manner described elsewhere in this disclosure. Transaction records 436 include records of existing transactions completed relative to a boundary that is going to be crossed. For example, transaction records 436 include, but are not limited to already procured permission documents that are applicable to the boundary.

Component 442 uses mapping data 430 and location information 424 to detect a boundary some distance away from the device, and which is likely going to be crossed by the device sometime in the future depending upon the speed of the movement of the device and the distance to the boundary. Component 444, using external system communications 426, performs one or more communication operations, one or more transactions, or a combination thereof, (collectively referred to as "interactions"), with a boundary management data processing system. For example, component 444 establishes communications with the boundary management data processing system, acknowledges communications from boundary management data processing system, sends a request for conditions associated with the detected boundary, receives information about a condition, sends an existing permission document or an identifier thereof, sends a request to procure a permission document, receive an acceptance of a permission document, receive a rejection of a permission document, receive a new permission document, and performs other similarly purposed interactions with the boundary management data processing system over external system communications 426. When a financial transaction is involved, such as in procuring a permission document from the boundary management data processing system, component 446 performs e-commerce-specific tasks, such as identity verification, method of payment presentment from profile 434, encryption, authorization, and other such tasks commonly performed in e-commerce transactions of financial nature.

As described above, user interface 402 is optional in the depicted configuration. When the device is capable of presenting user interface 402, component 448 operates user interface 402 in the manner described with respect to FIG. 3.

Figure 5:
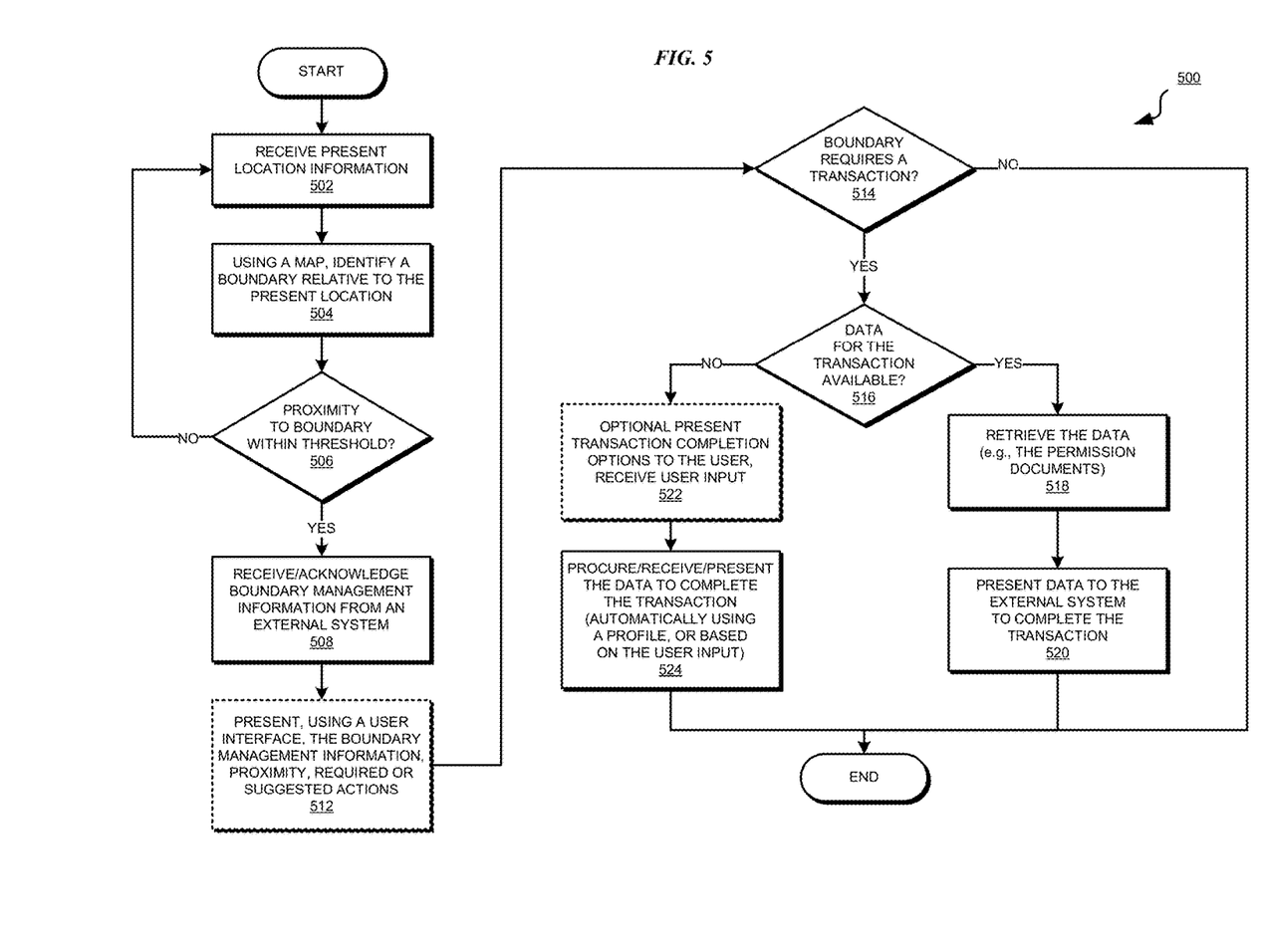
FIG. 5 depicts a flowchart of an example process for automatic boundary detection and transaction completion in accordance with an illustrative embodiment.

With reference to FIG. 5, this figure depicts a flowchart of an example process for automatic boundary detection and transaction completion in accordance with an illustrative embodiment. Process 500 can be implemented in application 422 in FIG. 4.

The application receives information about the present location of the device where the application is executing (block 502). The application, using mapping data, identifies a boundary relative to the present location (block 504).

The application determines whether the device is within a proximity distance set for a type of boundary corresponding to the identified boundary (block 506). If the application determines that the device is not within a proximity distance of the boundary ("No" path of block 506), the application returns process 500 to block 502.

If the application determines that the device is within a proximity distance of the boundary ("Yes" path of block 506), the application receives or acknowledges communication from a boundary management data processing system (block 508). The communication from the boundary management data processing system provides boundary management information to the application, including but not limited to one or more conditions associated with crossing the boundary, and requirements to satisfy those conditions. Optionally, using a user interface, the application presents to a user the boundary management information, location and proximity data, required or suggested actions, available or needed information, and so on (block 512).

The application determines whether the boundary requires a transaction to be completed with the boundary management data processing system (block 514). Note that not all boundaries have conditions associated with their crossing. If the boundary does not require a transaction to be completed with the boundary management data processing system ("No" path of block 514), the application ends process 500 thereafter.

If the boundary requires a transaction to be completed with the boundary management data processing system ("Yes" path of block 514), the application determines whether the data required transaction is available (block 516). For example, if a permission document has to be presented in the transaction of block 514, the application determines in block 516 whether the permission document is already available in or accessible from the device.

If the data for the transaction is available ("Yes" path of block 516), the application retrieves the data, e.g., the existing permission document, from a repository (block 518). The application presents the retrieved data to the external system—the boundary management data processing system—to complete the transaction required in block 514 (block 520). The application ends process 500 thereafter.

If the data for the transaction is not available or accessible from the device ("No" path of block 516), the application optionally presents available options for completing the transaction on a user interface to the user, and receives one or more inputs according to a selected option (block 522). The application procures, receives, presents, or some combination thereof, the data to complete the transaction (block 524). For example, when block 522 is omitted, the application performs the operations of block 524 automatically and without user intervention. When block 522 is performed, the application performs the operations of block 524 semi-automatically using the user inputs from block 522. The application ends process 500 thereafter.

Thus, a computer implemented method, system or apparatus, and computer program product are provided in the illustrative embodiments for automatic boundary detection and transaction completion. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for navigating across a boundary in geographical space, the method comprising:

receiving, at an application executing in a hardware device, a present location of the hardware device;

identifying, using a mapping data, a boundary relative to the present location, wherein the device is expected to cross a geographical location according to the boundary at a future time;

communicating, in a first transaction with a system associated with the boundary, to determine a condition that has to be satisfied prior to crossing the geographical location according to the boundary;

determining, by a processor, whether a permission document sufficient to satisfy the condition is accessible from the device;

presenting, automatically, and responsive to the permission document being accessible from the device, the permission document to the system in a second transaction; and indicating, at the device, responsive to an acceptance of the permission document in a second transaction received from the system, that the device is permitted to navigate across the boundary at the geographical location.

2. The method of claim 1, further comprising:

determining whether a second permission document sufficient to satisfy the condition is accessible from the device;

forming, responsive to the second permission document being inaccessible from the device, a third transaction to procure the second permission document; and transmitting the third transaction to the system.

3. The method of claim 2, further comprising:
receiving, responsive to the third transaction, the second permission document from the system in a fourth transaction, wherein the receiving of the second permission document comprises an acceptance of the second permission document by the system, wherein the indicating is further responsive to the acceptance of the second permission document.

4. The method of claim 2, further comprising:
presenting, on a user interface associated with the device, information describing the condition, the boundary, and the second permission document;
receiving a user input at the user interface, the user input selecting an e-commerce component of the third transaction, wherein the forming using the e-commerce component to form the third transaction.

5. The method of claim 1, further comprising:
presenting, on a user interface associated with the device, information describing the condition, the boundary, and the permission document;
selecting, according to a user input at the user interface, the permission document.

6. The method of claim 1, further comprising:
determining whether the device is within a proximity distance from the boundary, wherein the communicating occurs responsive to the device being within the proximity distance from the boundary.

7. The method of claim 1, further comprising:
determining that the device is at a first distance greater than a proximity distance set for a type associated with the boundary, wherein the communicating occurs at the first distance responsive to the system being reachable from the device at the first distance.

8. The method of claim 7, wherein the communicating occurs further responsive to an initial communication initiated by the system to the device.

9. The method of claim 1, further comprising:
communicating with a second system associated with a second boundary to determine a second condition that has to be satisfied prior to crossing a second geographical location according to the second boundary; and
indicating, at the device, responsive to the second condition being absent, that the device is permitted to cross the second geographical location.

10. The method of claim 1, wherein the method is embodied in a computer program product comprising one or more computer-readable storage devices and computer-readable program instructions which are stored on the one or more computer-readable tangible storage devices and executed by one or more processors.

11. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

12. A computer program product for navigating across a boundary in geographical space, the computer program product comprising:
one or more computer-readable tangible storage devices;
program instructions, stored on at least one of the one or more storage devices, to receive, at an application executing in a hardware device, a present location of the hardware device;
program instructions, stored on at least one of the one or more storage devices, to identify, using a mapping data, a boundary relative to the present location, wherein the device is expected to cross a geographical location according to the boundary at a future time;
program instructions, stored on at least one of the one or more storage devices, to communicate, in a first transaction with a system associated with the boundary, to determine a condition that has to be satisfied prior to crossing the geographical location according to the boundary;
program instructions, stored on at least one of the one or more storage devices, to determine whether a permission document sufficient to satisfy the condition is accessible from the device;
program instructions, stored on at least one of the one or more storage devices, to present, automatically, and responsive to the permission document being accessible from the device, the permission document to the system in a second transaction; and
program instructions, stored on at least one of the one or more storage devices, to indicate, at the device, responsive to an acceptance of the permission document in a second transaction received from the system, that the device is permitted to navigate across the boundary at the geographical location.

13. The computer program product of claim 12, further comprising:
program instructions, stored on at least one of the one or more storage devices, to determine whether a second permission document sufficient to satisfy the condition is accessible from the device;
program instructions, stored on at least one of the one or more storage devices, to form, responsive to the second permission document being inaccessible from the device, a third transaction to procure the second permission document; and
program instructions, stored on at least one of the one or more storage devices, to transmit the third transaction to the system.

14. The computer program product of claim 13, further comprising:
program instructions, stored on at least one of the one or more storage devices, to receive, responsive to the third transaction, the second permission document from the system in a fourth transaction, wherein the receiving of the second permission document comprises an acceptance of the second permission document by the system, wherein the indicating is further responsive to the acceptance of the second permission document.

15. The computer program product of claim 13, further comprising:
program instructions, stored on at least one of the one or more storage devices, to present, on a user interface associated with the device, information describing the condition, the boundary, and the second permission document;
program instructions, stored on at least one of the one or more storage devices, to receive a user input at the user interface, the user input selecting an e-commerce component of the third transaction, wherein the forming using the e-commerce component to form the third transaction.

16. The computer program product of claim 12, further comprising:
program instructions, stored on at least one of the one or more storage devices, to present, on a user interface associated with the device, information describing the condition, the boundary, and the permission document;

program instructions, stored on at least one of the one or more storage devices, to select, according to a user input at the user interface, the permission document.

17. The computer program product of claim 12, further comprising:

program instructions, stored on at least one of the one or more storage devices, to determine whether the device is within a proximity distance from the boundary, wherein the communicating occurs responsive to the device being within the proximity distance from the boundary.

18. The computer program product of claim 12, further comprising:

program instructions, stored on at least one of the one or more storage devices, to determine that the device is at a first distance greater than a proximity distance set for a type associated with the boundary, wherein the communicating occurs at the first distance responsive to the system being reachable from the device at the first distance.

19. The computer program product of claim 18, wherein a communication according to the program instructions to communicate occurs further responsive to an initial communication initiated by the system to the device.

20. A computer system for navigating across a boundary in geographical space, the computer system comprising:

one or more processors, one or more computer-readable memories and one or more computer-readable storage devices;

program instructions, stored on at least one of the one or more storage devices for execution by at least one of the one or more processors via at least one of the one or more memories, to receive, at an application executing in a hardware device, a present location of the hardware device;

program instructions, stored on at least one of the one or more storage devices for execution by at least one of the one or more processors via at least one of the one or more memories, to identify, using a mapping data, a boundary relative to the present location, wherein the device is expected to cross a geographical location according to the boundary at a future time;

program instructions, stored on at least one of the one or more storage devices for execution by at least one of the one or more processors via at least one of the one or more memories, to communicate, in a first transaction with a system associated with the boundary, to determine a condition that has to be satisfied prior to crossing the geographical location according to the boundary;

program instructions, stored on at least one of the one or more storage devices for execution by at least one of the one or more processors via at least one of the one or more memories, to determine whether a permission document sufficient to satisfy the condition is accessible from the device;

program instructions, stored on at least one of the one or more storage devices for execution by at least one of the one or more processors via at least one of the one or more memories, to present, automatically, and responsive to the permission document being accessible from the device, the permission document to the system in a second transaction; and program instructions, stored on at least one of the one or more storage devices for execution by at least one of the one or more processors via at least one of the one or more memories, to indicate, at the device, responsive to an acceptance of the permission document in a second transaction received from the system, that the device is permitted to navigate across the boundary at the geographical location.

* * * * *